(No Model.) 2 Sheets—Sheet 1.
C. P. MOSHER & N. R. STREETER.
FLOOR MIRROR.
No. 574,254. Patented Dec. 29, 1896.
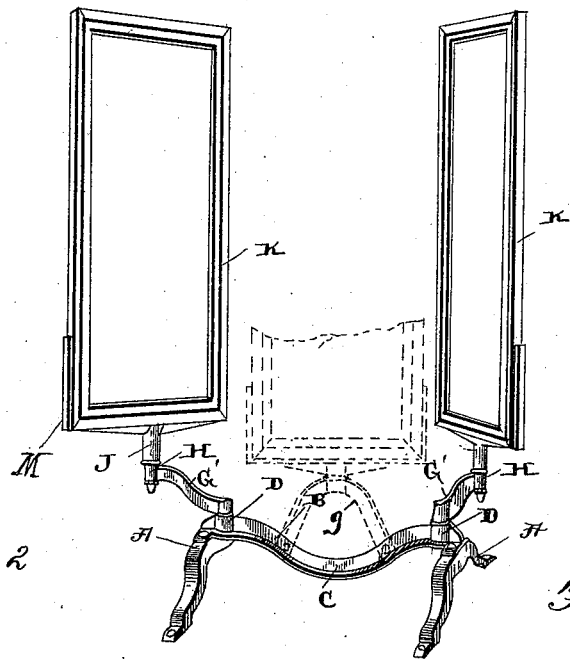
Fig. 1.
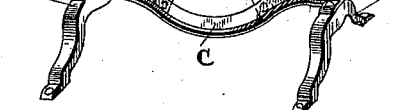
Fig. 2. Fig. 3.
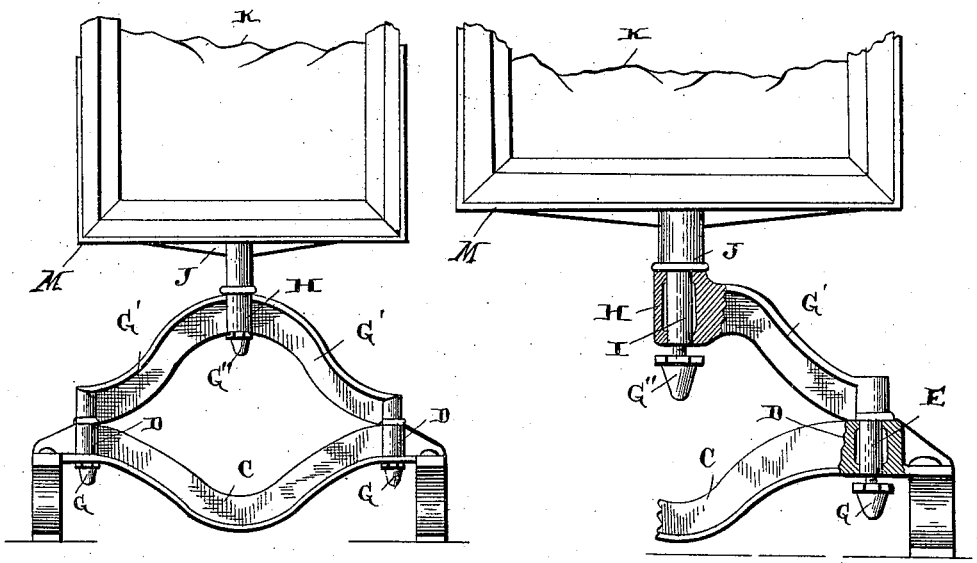
Witnesses:
Geo. E. Frech
James W. Berant
Inventors
C. P. Mosher
N. R. Streeter
by Pattison Nesbit
Attorneys

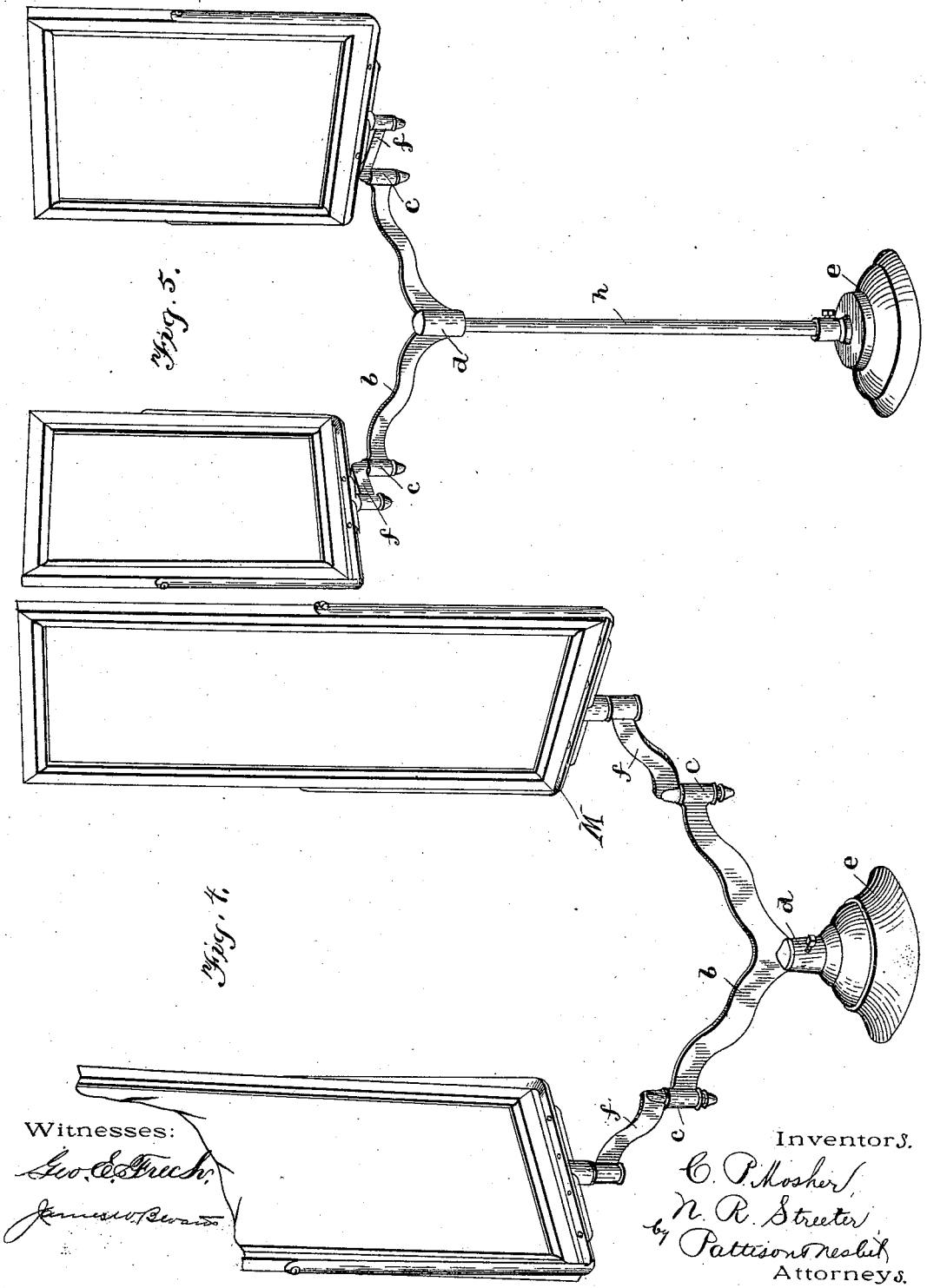

UNITED STATES PATENT OFFICE.

CHARLES P. MOSHER AND NELSON R. STREETER, OF GROTON, NEW YORK.

FLOOR-MIRROR.

SPECIFICATION forming part of Letters Patent No. 574,254, dated December 29, 1896.

Application filed June 8, 1895. Serial No. 552,149. (No model.)

*To all whom it may concern:*

Be it known that we, CHARLES P. MOSHER and NELSON R. STREETER, of Groton, in the county of Tompkins and State of New York, have invented certain new and useful Improvements in Floor-Mirrors; and we do hereby declare the following to be a full, clear, and exact description of the invention, such as will enable others skilled in the art to which it pertains to make and use it, reference being had to the accompanying drawings, which form part of this specification.

Our invention relates to improvements in mirrors, and relates more particularly to that class of mirrors which are used in clothing establishments and other places, though it is equally adapted for use in private houses, all of which will be especially referred to hereinafter and particularly pointed out in the claims.

The object of our invention is to construct a cheap and simple mirror, more especially adapted to be used as a floor-mirror, though not limited to such use, whereby two mirrors are supported and adapted to be swung around to leave an open frame for the user to step back and forth between when used upon the floor, or to close the mirrors face to face or back to back at the center of the frame, or to place them in various and almost indefinite number of angles in relation to each other, each of which will be separately referred to hereinafter.

In the drawings, Figure 1 represents a perspective view of a mirror embodying our invention, showing the mirrors separated and leaving an open space between them. Fig. 2 is a view showing the mirrors carried to the center and placed back to back. Fig. 3 is an enlarged view of the lower portion of one of the mirrors, a portion of the reach, and one of the swinging arms, the same being shown partly in section. Fig. 4 is a view showing a modification in the manner of supporting and forming the reach or supporting-arms. Fig. 5 is a view showing the mirrors supported upon a tall rod having a base.

We will first describe Figs. 1, 2, and 3, in which A designates the feet or base, to which the reach B has its ends secured at the center of the feet, the feet being preferably substantially U-shaped, as shown, with their ends formed to receive screws, if desired, for fastening them firmly to the floor or other support. The reach B is curved downward at the center, as shown at C, to nearly the level of the under side of the feet, the purpose of which will be referred to hereinafter.

Near each end of the reach B are the sockets D, which are recessed between their ends, as shown in Fig. 3, so that the pintles or journals E at the lower ends of the swinging arms G' will engage only the ends of the sockets, thus reducing friction and facilitating the manufacture of the device. A screw G or other mechanical equivalent is used to hold the pintle or journal E in the sockets D, as will be understood.

The upper ends of the swinging arms G' are provided with sockets H, also recessed, and these sockets receive the pintles I at the centers of the lower end of the frames J, which frames receive the glasses K. The pintle or journal I, depending from the center of the lower end of mirror-frame J is likewise held in position by means of a screw or other equivalent device G''.

The swinging arms G', of which there are two, as clearly shown, curve upward and are of equal lengths, that is, one-half the distance between the sockets D of the reach B, so that when they are folded together, as shown in Fig. 2, an oblong space is formed between the reach and the arms, and the mirrors will be directly one behind the other, either back to back, as shown in Fig. 2, or face to face, as convenience or the wishes of the user may dictate.

It will be noticed that the mirror-frames are free to be rotated on their central depending pintles or journals I in the ends of the swinging arms, while the opposite ends of the swinging arms are free to be rotated around and around or placed in any other desired position in respect to each other or in respect to the frame or base, which consists of the reach and the feet transversely connected to opposite ends thereof. The ends of the reach are bolted or otherwise conveniently attached to the feet, the feet having a flat portion *a* for the purpose of receiving the ends of the reach, as clearly illustrated.

When the mirrors are placed in the position shown in Fig. 1, a person can stand between them and view opposite sides or the back and front of themselves, or the mirrors can be turned at any angle for the purpose of permitting a person to see any part of himself, as will be readily understood. This simple arrangement enables the mirrors to be turned, as shown in Fig. 1, so that the user can step back and forth through them, and also enables them to be used in the aisle of a furnishing store in which the space must be economized, so that persons can pass freely back and forth between the mirrors, and they can be placed back to back or face to face, so as to take up but little space when not in use; also, by placing them face to face injury to them is prevented when they are not being used. When placed back to back, they can be used separately by persons at either side thereof, and if desired the arms can be turned outward in a line with each other and with the reach, say, approximately, the position shown in Fig. 1, and the mirrors then turned back to back and separately used. So, also, it will be readily understood that the mirrors can be placed at all of the varying angles in a circle by turning them upon their pintles I, and in combination with all of the varying angles in relation to each other within complete circles capable of being made by the swinging arms.

From this description it will be seen that varying angles and positions in which these mirrors can be placed are almost indefinite and make their usefulness of considerable scope.

Attention is also directed to the fact that there is no reach at the top of the mirrors, so that there is nothing to interfere with a person passing between them, and that the whole construction and mechanism whereby these angles and movements are accomplished is very simple and easy to construct.

The reach is preferably T-shaped in cross-section, while the feet are preferably of an inverted-U shape in cross-section, thus making both strong but comparatively light.

The pintles I depend from the U-shaped metal frame M, which receives the mirror-frame K, as clearly shown. Instead of having the pintles upon the swinging arms this construction may be reversed and the pintles formed upon the reach, and the same is true of the construction whereby the mirror-frames are journaled to the opposite ends of the swinging arms, but we prefer the construction here shown, yet we do not wish to limit ourselves thereto.

Referring now to Fig. 4, it will be seen that the arms or supports $b$, which are in effect the same as the reach B in Figs. 1, 2, and 3, are differently shaped and extend in opposite directions from a socket $d$, which is placed upon a round base $e$. Figs. 1, 2, and 3 show a reach having end supports or feet, while Figs. 4 and 5 show a reach or support having a central base or foot. The upper ends of these arms $b$ are provided with the sockets $c$ for the reception of the pintles upon the swinging arms $f$, which swinging arms are the same in construction substantially as that shown in Figs. 1, 2, and 3, before referred to. This figure is the same substantially as Figs. 1, 2, and 3, the difference merely being that the reach has a central instead of end supports. The invention is not varied in any respect.

By reference to Fig. 5 it will be seen that the arms $b$ have their central socket $d$ receive a tall rod $h$, the lower end of the rod having a supporting-base $i$. In this instance the mirrors are smaller, owing to the fact that they are adapted for the upper portion of the person only, while where the mirrors are made tall and near the floor they are to be used as floor-mirrors to exhibit the whole or substantially the whole height of the person. It will be readily conceived that the manner of supporting these arms $b$ in Figs. 4 and 5 or the reach B in Figs. 1, 2, and 3 may be varied without affecting in any manner our invention. Instead of having a socket $d$ upon the center of the arms $b$ a base may be made integral with the reach at its center for supporting it.

In Figs. 1, 2, and 3 the mirror-frames K are shown firmly held in the frame J, while in Figs. 4 and 5 the mirror-frames $m$ extend upward to or slightly above the center of the mirror-frame, and the mirror-frames $n$ are pivoted thereto, so that they may be tilted. These are modifications which do not affect or vary whatever our invention, which consists in having the swinging arms supported at separated points, so that they may be swung around toward or away from each other or form a complete circle.

It will be readily understood that a central mirror may be attached to either the reach B or the arms $b$ by means of a bolted portion $g$, as shown in dotted lines in Fig. 1.

Having thus described our invention, what we claim, and desire to secure by Letters Patent, is—

1. In combination, a horizontally-disposed support, the two swinging arms at corresponding ends pivoted to opposite portions of said support respectively, each arm free to swing in a complete circle above said support and in length equal approximately to one-half the distance between the arm-pivots on said support, and the two mirrors extending vertically from said arms, each mirror having a bottom supporting-frame, each frame mounted to turn on the free end of its arm by a vertical pivot, so that the two mirrors are supported entirely by said arms and bottom supporting-frames, and can be arranged back to back above the central portion of the support or can be swung to any angle beyond opposite ends of the support leaving a free passage between them and over the support, substantially as shown and described.

2. In combination, a horizontally-disposed reach-bar provided with a support, the two horizontally-swinging arms of approximately the same length and each in length equal approximately to one-half of the distance between the arm-pivots on the reach, the arms, respectively, pivoted at corresponding ends to opposite portions of the reach so that each arm can swing in a complete circle, and the two mirrors carried by said arms and each provided with a U-shaped upright supporting-frame provided with a vertical pivot centrally arranged beneath the mirror and mounted to turn in the free end of an arm, whereby the two mirrors can be arranged back to back above the central portion of the reach or can be swung to any angle beyond opposite ends of the reach leaving a free passage between them and over the reach, substantially as described.

In testimony whereof we affix our signatures in presence of two witnesses.

CHARLES P. MOSHER.
    NELSON R. STREETER.

Witnesses:
 W. B. GALE,
 CHAS. O. RHODES.